(12) United States Patent
Socolsky (10) Patent No.: US 8,141,589 B2
(45) Date of Patent: Mar. 27, 2012

(54) FLUID FLOW LABYRINTH

(75) Inventor: Esteban Ariel Socolsky, D.N. Negev (IL)

(73) Assignee: Netafim, Ltd., Tel Aviv (IL)

( * ) Notice: Subject to any disclaimer, the term of this patent is extended or adjusted under 35 U.S.C. 154(b) by 737 days.

(21) Appl. No.: 12/374,019

(22) PCT Filed: Jul. 19, 2006

(86) PCT No.: PCT/IB2006/052473
§ 371 (c)(1),
(2), (4) Date: Jan. 15, 2009

(87) PCT Pub. No.: WO2008/010026
PCT Pub. Date: Jan. 24, 2008

(65) Prior Publication Data
US 2009/0165879 A1    Jul. 2, 2009

(51) Int. Cl.
*F15D 1/04* (2006.01)
(52) U.S. Cl. .............. 138/42; 138/39; 138/37; 239/542; 239/547
(58) Field of Classification Search .................... 138/43, 138/39, 46; 239/542, 547
See application file for complete search history.

(56) References Cited

U.S. PATENT DOCUMENTS

| | | | |
|---|---|---|---|
| 4,215,822 A * | 8/1980 | Mehoudar | 239/542 |
| 4,655,397 A | 4/1987 | Gorney | 239/542 |
| 5,400,973 A * | 3/1995 | Cohen | 239/533.1 |
| 5,673,852 A | 10/1997 | Roberts | 239/1 |
| 6,250,571 B1 * | 6/2001 | Cohen | 239/542 |
| 6,568,607 B2 * | 5/2003 | Boswell et al. | 239/542 |

FOREIGN PATENT DOCUMENTS
WO    WO 89/09539    10/1989

OTHER PUBLICATIONS
International Search report and Written Opinion in PCT/IB2006/052473, dated May 14, 2007.

* cited by examiner

*Primary Examiner* — Patrick F Brinson
(74) *Attorney, Agent, or Firm* — Womble Carlyle (57) ABSTRACT

A labyrinth channel for reducing pressure and/or flow rate in a liquid flowing in the channel, the labyrinth channel having a bottom surface and first and second opposing walls and comprising: a first array of spaced apart first baffle teeth that have non-parallel upstream and downstream faces and extend from the first wall towards the second wall to terminate in an end; and a second array of spaced apart second baffle teeth that have non-parallel upstream and downstream faces and extend from the second wall towards the first wall to terminate in an end; wherein baffle teeth in different arrays have a substantially same shape and upstream faces of closest baffle teeth in different arrays are different and/or downstream faces of closest baffle teeth in different arrays are different.

31 Claims, 7 Drawing Sheets

FLUID FLOW LABYRINTH

The invention relates to fluid flow control labyrinths and in particular labyrinths that are used to restrict water flow from emitters used in drip irrigation.

BACKGROUND OF THE INVENTION

Irrigation systems that deliver water, often containing plant nutrients, pesticides and/or medications, to plants via networks of irrigation pipes are very well known. In many such irrigation networks, water from an irrigation pipe is delivered to the plants by "emitters" or "drippers", hereinafter generically referred to as emitters, which are connected to or installed along the length of the pipe. Each emitter comprises at least one inlet or an array of inlets through which water flowing in the pipe enters the emitter and an outlet through which water that enters the emitter exits the emitter. The emitter diverts a relatively small portion of water flowing in the pipe and discharges the diverted water to irrigate plants in a neighborhood of the location of the emitter.

Generally, to control rate of water discharge by the emitter, the emitter comprises a water flow and pressure reduction channel, a "labyrinth channel" or "labyrinth" through which water that enters the emitter must flow to reach the emitter outlet. The labyrinth channel is a high resistance flow channel along which pressure of water flowing through the emitter drops relatively rapidly with distance along the labyrinth channel from a relatively high water pressure which prevails substantially at or near the emitter inlet to a relatively low discharge pressure, generally a gauge pressure equal to about zero, substantially at or near the emitter outlet. The labyrinth channel generally comprises a tortuous "obstacle" flow path that generates turbulence in water flowing in the labyrinth to reduce water pressure and discharge of water by the emitter. Usually the obstacle path comprises a configuration of baffles that impede and introduce turbulence into water flow.

U.S. Pat. No. 4,060,200 to Mehouder, the disclosure of which is incorporated herein by reference, describes a labyrinth channel comprising two opposing arrays of equally spaced baffle "teeth" that extend out towards each other from opposite walls of the channel. Each tooth has a cross section perpendicular to the wall substantially in the shape of a truncated isosceles triangle, i.e. the apex of the triangle is "cut off". The arrays of baffle teeth are substantially mirror images of each other but are displaced relative to each other along the channel by half a repeat period of the baffle teeth, i.e. by half the distance between adjacent baffle teeth. A tooth in one baffle array therefore faces a point in a space, hereinafter a "bay" substantially half way between adjacent baffle teeth in the other array. The tips of two adjacent baffle teeth in one baffle array in the labyrinth and the tip of the tooth in the opposing baffle array that faces the bay formed by the adjacent baffle teeth are substantially coplanar.

U.S. Pat. No. 5,207,386, the disclosure of which is incorporated herein by reference, also to Mehoudar, describes a labyrinth channel comprising a central "through-flow" flow channel that does not comprise impediments to water flow. The impediment free through-flow channel is flanked on either side by an array of equally spaced, symmetric baffle teeth, similar to the arrays of baffle teeth described in U.S. Pat. No. 4,060,200. As in U.S. Pat. No. 4,060,200, the baffle teeth arrays in U.S. Pat. No. 5,207,386 are displaced relative to each other along the labyrinth channel by half a repeat period of the baffle teeth.

U.S. Pat. No. 5,207,386 notes that a labyrinth channel comprising a central, impediment free through-flow channel, provides greater reduction in water flow pressure per unit length of the labyrinth than other labyrinth channels. The patent provides a range for the width of the through-flow channel and an optimum for its width relative to dimensions of the baffle teeth. The patent notes that the increased pressure reduction functionality results in a "comparatively low" sensitivity of outflow of water from an emitter to changes in inlet water pressure to the emitter. In addition, the improved pressure reduction functionality enables shorter labyrinth channels to be used to reduce water pressure in emitters, and as a result enables emitters to be produced less expensively.

US Patent Publication 2003/0150940, the disclosure of which is incorporated herein by reference, shows a labyrinth channel comprising two opposing rows of equally spaced baffle "fingers" that extend out towards each other from opposite walls of the channel. The tips of the finger baffles are terraced so that tips of the fingers decrease step-wise in size with height of the fingers off the floor of the channel. The labyrinth channel does not comprise a through-flow channel and tips of fingers in each row extend into spaces between fingers of the other row, i.e. the fingers mesh. All the fingers appear to be tilted at a same angle towards a downstream direction of water flow.

PCT publication WO 00/01219, the disclosure of which is incorporated herein by reference, describes a "sawblade-shaped zig-zagging" pattern comprised in a fluid flow regulatory channel of an irrigation pipe. The zig-zagging pattern is embossed on a relatively thin web of flexible plastic material. The web is folded over so that longitudinal edges of the web overlap and regions of the overlapping edges are welded to form the irrigation pipe and regulatory channel comprising the zig-zagging pattern.

SUMMARY OF THE INVENTION

An aspect of some embodiments of the invention relates to providing a labyrinth channel that comprises a new configuration of baffles for reducing pressure in a fluid that flows through the channel and/or the fluid flow rate through the channel.

An aspect of some embodiments of the invention relates to providing a labyrinth channel comprising opposing arrays of baffle teeth that extend toward each other from opposite side walls of the channel and for which upstream and downstream sides of the baffle teeth have different configurations and are not parallel. Baffle teeth in different arrays have a same shape and upstream sides of closest baffle teeth in different arrays have different configurations and/or downstream sides of closes baffle teeth in different arrays have different configurations. A configuration of a side of a baffle tooth refers to a geometrical shape of the side and/or orientation of the side. Hereinafter an upstream or downstream side of a baffle tooth is referred to as a "face" and baffle faces having different configurations are referred to as being different.

In an embodiment of the invention, each array of baffle teeth in a labyrinth channel comprises baffle teeth, hereinafter "shark-fin baffle teeth", which have a cross section shape reminiscent of a shark's dorsal fin. Each shark-fin baffle tooth has an optionally planar "leading-edge face surface" and an optionally planar "trailing-edge face surface". The leading-edge face surface is more swept back with respect to the side-wall of the channel from which the tooth extends than the trailing-edge face surface. The leading-edge face surface is oriented at an angle with respect to the side wall that is more acute than an angle that the trailing-edge face surface makes with the side wall.

In an embodiment of the invention, the leading-edge face surfaces of shark-fin baffle teeth in one array and their nearest shark-fin baffle teeth "neighbors" in the other array face in opposite upstream and downstream directions. That is, the leading-edge face surfaces of baffle teeth in the first array and the trailing-edge face surfaces of their nearest baffle teeth neighbors in the other array face in a same upstream or downstream direction.

Optionally, the shark-fin baffle teeth in a same array are equidistant from each other and are positioned so that the baffle teeth in one array are located opposite the bay regions between adjacent baffle teeth in the other array. Optionally, the baffle teeth in the opposing arrays mesh. Optionally, the tips of two adjacent shark-fin baffle teeth in one baffle array in the labyrinth and the tip of the shark-fin baffle tooth in the opposing baffle array that faces the bay between the two adjacent baffle teeth are substantially coplanar. In some embodiments of the invention, the labyrinth channel comprises a through-flow channel located between the opposing arrays of shark-fin baffles.

There is therefore provided in accordance with an embodiment of the invention, a labyrinth channel for reducing pressure and/or flow rate in a liquid flowing in the channel, the labyrinth channel having a bottom surface and first and second opposing walls and comprising: a first array of spaced apart first baffle teeth that have non-parallel upstream and downstream faces and extend from the first wall towards the second wall to terminate in an end; a second array of spaced apart second baffle teeth that have non-parallel upstream and downstream faces and extend from the second wall towards the first wall to terminate in an end; wherein baffle teeth in different arrays have a substantially same shape and upstream faces of closest baffle teeth in different arrays are different and/or downstream faces of closest baffle teeth in different arrays are different.

Optionally, ends of the first teeth are contiguous with or intersect a same first surface that follows a contour of the labyrinth flow channel. Optionally, ends of the second teeth are contiguous with or intersect a same second surface that follows a contour of the labyrinth flow channel. Optionally, the first and second surfaces that follow the channel contour are coincident. Alternatively, the first and second surfaces that follow the channel contour are parallel and displaced one from the other.

In some embodiments of the invention, each tooth has a planar trailing-edge surface that makes an external angle $\beta$ with the wall from which the tooth extends. Optionally, $\beta$ has a value less than or equal to 100°. Alternatively or additionally, $\beta$ optionally has a value greater than or equal to 80°. Optionally, $\beta$ has a value substantially equal to 90°.

In some embodiments of the invention, each tooth has a planar leading-edge surface that makes an included angle $\alpha$ with the trailing edge surface. Optionally, $\alpha$ has a value less than or equal to 45°. Additionally or alternatively, $\alpha$ optionally has a value greater than or equal to 15°.

In some embodiments of the invention, the value of $\alpha$ is the same for all baffle teeth. In some embodiments of the invention, the value of $\beta$ is the same for all baffle teeth.

In some embodiments of the invention, one of the leading-edge and trailing-edge face surfaces of a tooth is an upstream face of the tooth. Optionally, if the upstream face of a first tooth is a leading-edge surface of the tooth, the downstream face of the nearest second tooth is the leading-edge surface of the second tooth.

In some embodiments of the invention, the upstream and downstream faces of a first baffle tooth are respectively parallel with the downstream and upstream faces of a nearest second baffle tooth. Optionally, a distance between the upstream face of a first baffle tooth and a nearest downstream face of a second baffle tooth is equal to a same distance "A" between the downstream face of the first baffle tooth and the nearest upstream face of a second baffle tooth. Optionally, A is less than or equal to 3 mm. Additionally or alternatively, A is greater than or equal to 0.3 mm.

In some embodiments of the invention, ends of the first and second teeth are located a same distance B from the respective walls from which they extend. Optionally, the channel has a width greater than 2 B. Alternatively, the channel has a width optionally less than 2 B. Optionally, the channel has a width substantially equal to about 2 B. In some embodiments of the invention, B is greater than A.

In some embodiments of the invention, the leading-edge and trailing-edge face surfaces intersect a common surface at different locations of the common surface to define an end surface of the tooth. Optionally, the common surface is planar. Optionally, the intersections of the leading and trailing edge surfaces are different parallel straight lines.

In some embodiments of the invention, the labyrinth channel or portion thereof is straight. In some embodiments of the invention, the labyrinth channel or a portion thereof is circular. In some embodiments of the invention, the bottom surface of the labyrinth channel or portion thereof is substantially a circularly cylindrical surface.

BRIEF DESCRIPTION OF FIGURES

Non-limiting examples of embodiments of the present invention are described below with reference to figures attached hereto. In the figures, identical structures, elements or parts that appear in more than one figure are generally labeled with a same symbol in all the figures in which they appear. Dimensions of components and features shown in the figures are chosen for convenience and clarity of presentation and are not necessarily shown to scale. The figures are listed below.

DETAILED DESCRIPTION OF EXEMPLARY EMBODIMENTS

Figure 1A:
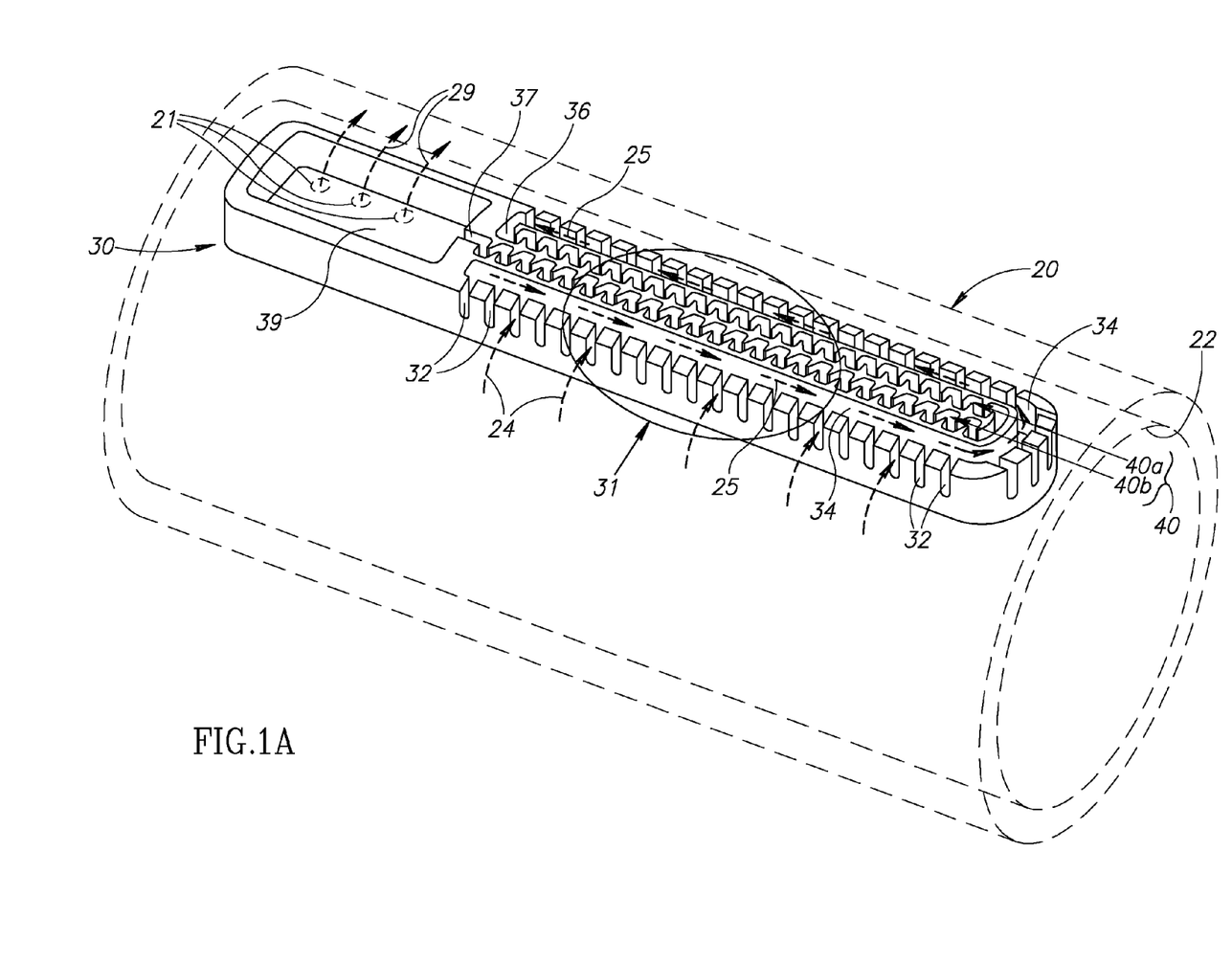
FIG. 1A schematically shows a perspective view of an irrigation pipe having an optionally internally mounted emitter comprising a labyrinth channel, in accordance with an embodiment of the invention.
Figure 1B:
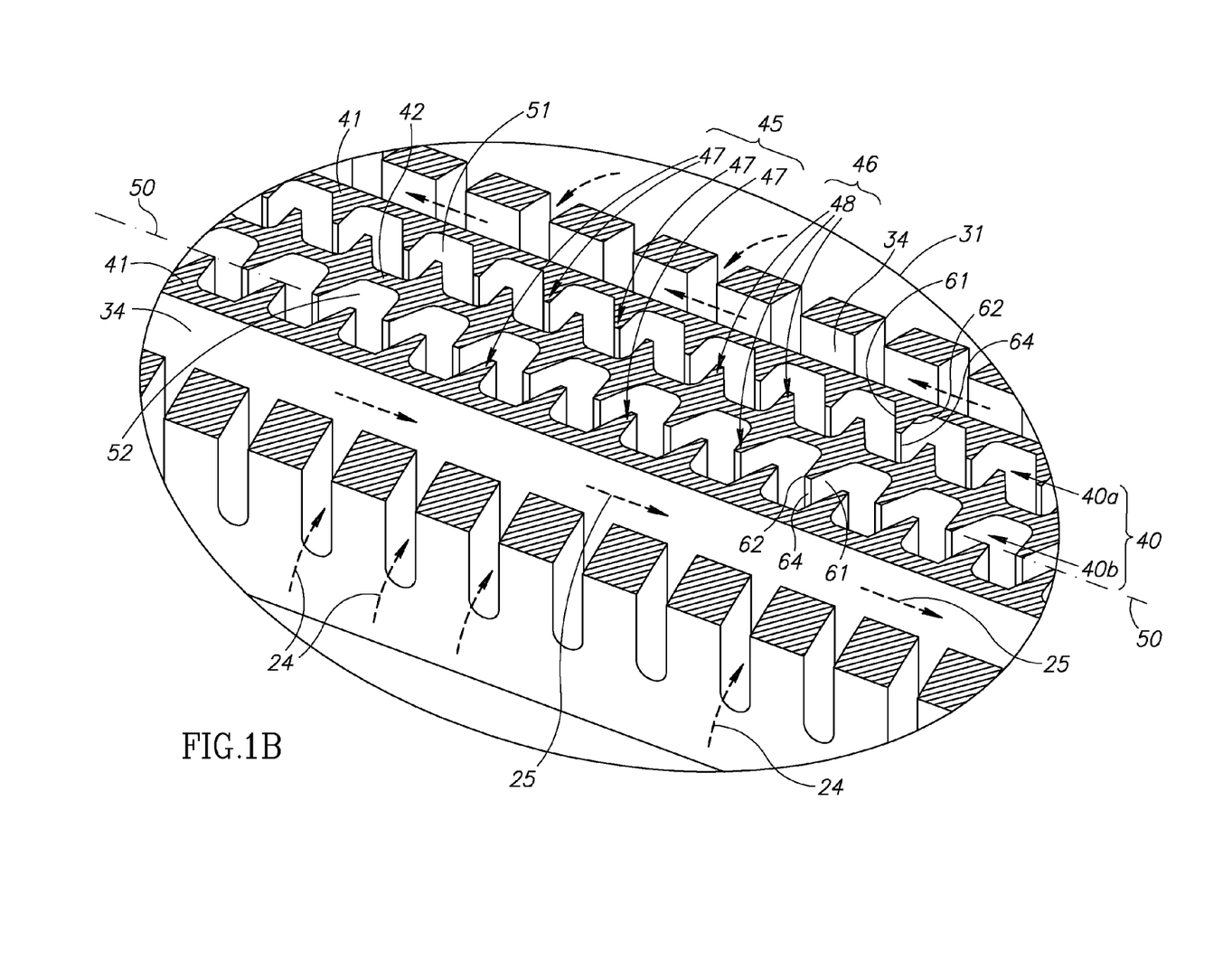
FIG. 1B schematically shows an enlarged view of a portion of the emitter shown in FIG. 1A.
Figure 1C:
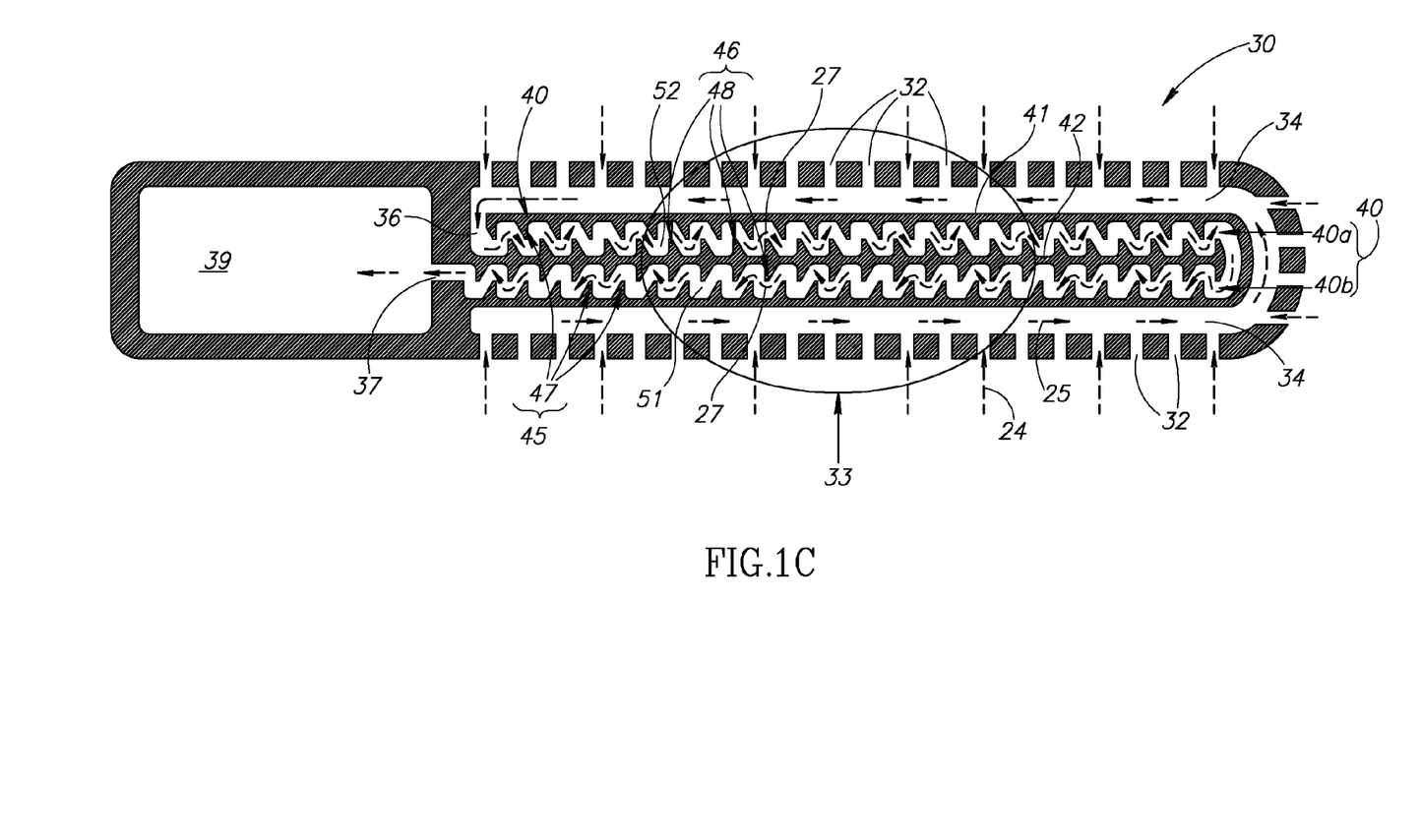
FIG. 1C schematically shows a plan view of the emitter shown in FIG. 1A.
Figure 1D:
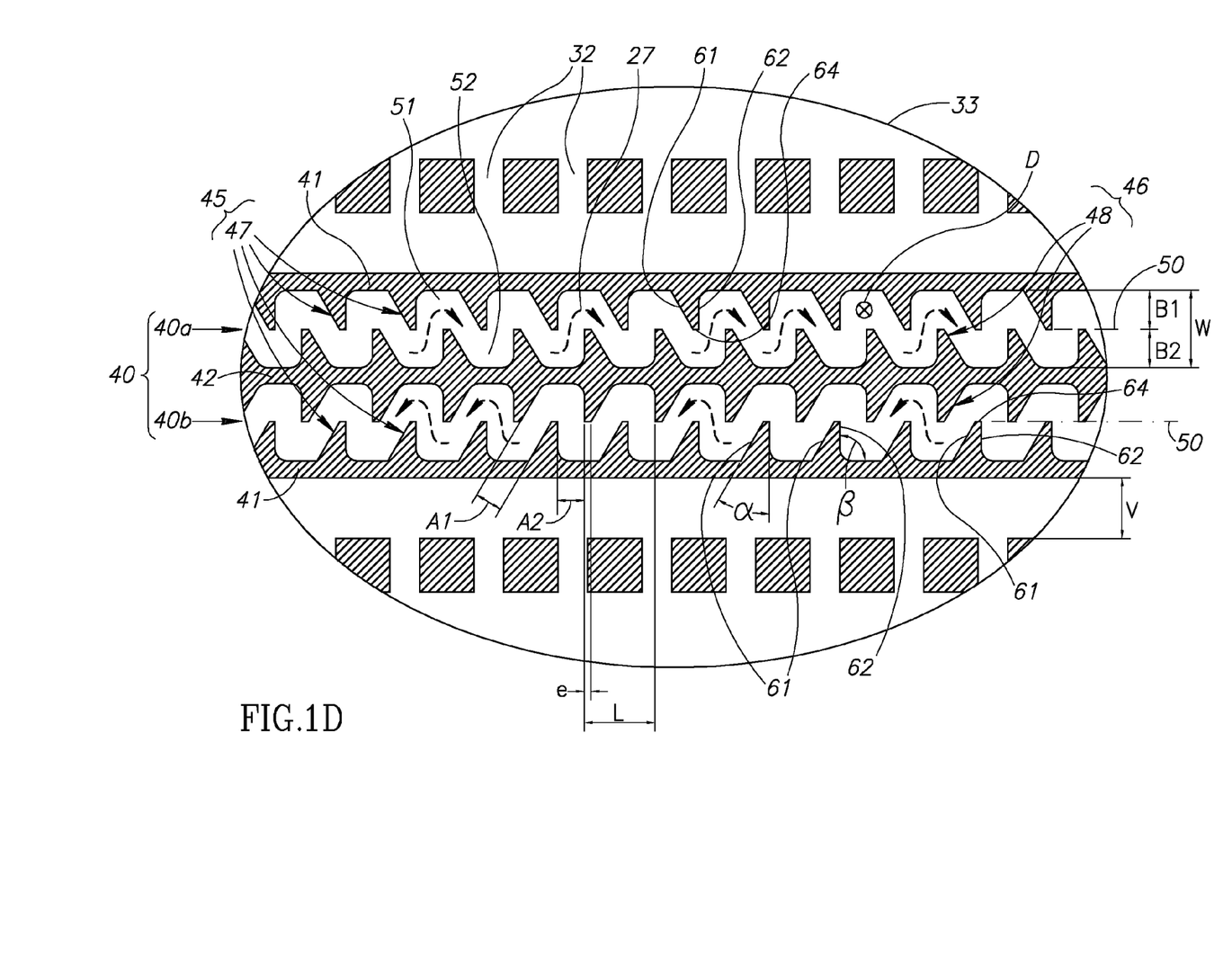
FIG. 1D schematically shows an enlarged view of a portion of the plan view shown in FIG. 1C greatly enlarged.

FIG. 1A schematically shows a perspective view of a portion of an irrigation pipe 20 having an internally mounted emitter 30 comprising a labyrinth channel 40, in accordance with an embodiment of the invention. An enlarged view of a portion of emitter 30 is shown in FIG. 1B. The enlarged portion of emitter 30 that is shown in FIG. 1B is indicated by an ellipse 31 in FIG. 1A. FIG. 1C schematically shows a plan view of emitter 30 and a portion, indicated by ellipse 33, of emitter 30 in FIG. 1C is shown greatly enlarged in FIG. 1D. Emitter 30 is optionally formed from a plastic and is bonded to an inside surface 22 of irrigation pipe 20 using any of various methods, such as thermal or ultrasound welding, known in the art. After bonding to surface 22, the portion of the surface to which it is bonded optionally forms a wall, or "roof" of the emitter that delimits labyrinth channel 40. In FIGS. 1B-1D surfaces of emitter 30 that are bonded to inside surface 22 of pipe 20 are shown shaded. Irrigation pipe 20 is formed with outlet orifices 21 from which fluid that emitter 30 diverts from fluid flowing in the pipe is discharged.

Emitter 30 is optionally formed having a plurality of inlet apertures 32 optionally located along an upper edge surface of the emitter which is bonded to inside surface 22 of irrigation pipe 20. Optionally, emitter 30 is formed with additional inlet apertures (not shown) on a bottom surface of the emitter, which surface is not seen in the perspectives of FIGS. 1A-1D.

Water in irrigation pipe 20 enters emitter 30 through inlet apertures 32 at a relatively high inlet pressure equal to the water pressure in the irrigation pipe at the location of the emitter and flows into an optionally circumferential inlet channel 34. Water entering the emitter through inlet apertures 32 is schematically indicated for some of the apertures by bold dashed arrows 24. In inlet channel 34 the water flows in an optionally counterclockwise direction indicated by bold dashed arrows 25 until it reaches and enters an inlet portal 36 of labyrinth channel 40. The inlet portal, labyrinth channel 40 and water flow in the labyrinth channel are most clearly shown in FIGS. 1C and 1D.

Water that enters labyrinth inlet portal 36 flows generally in an optionally clockwise direction indicated by arrows 27 through labyrinth channel 40 until it reaches a labyrinth outlet portal 37 from which it exits the labyrinth and empties into a discharge reservoir 39. Because of the presence and configuration of baffle teeth arrays 45 and 46, labyrinth channel 40 is characterized by a relatively high resistance to water flow per unit length of the labyrinth. As a result, pressure of water that entered the channel at the relatively high inlet pressure drops rapidly per unit length of the labyrinth as the water flows through the labyrinth and the water flows into a discharge reservoir 39 at a relatively low flow rate and gauge pressure, optionally substantially equal to about zero. Water in discharge reservoir 39 drips out of irrigation pipe 20 via discharge apertures 21 that communicate with discharge reservoir 39 at a relatively low "drip" flow rate. Water discharging from the discharge apertures is indicated by dashed arrows 29 in FIG. 1A.

Labyrinth channel 40 optionally comprises an outer wall 41 and an inner wall 42 that extend from a channel floor and define a perimeter of the channel and two channel sections 40a and 40b. Labyrinth channel 40 is lined with opposing arrays 45 and 46 of baffle teeth in accordance with an embodiment of the invention. Array 45 comprises optionally sharkfin baffle teeth 47 that extend from outer wall 41 towards inner wall 42 and array 46 comprises optionally shark-fin baffle teeth 48 that extend from inner wall 42 towards outer wall 41. Optionally, baffle teeth 47 and 48 have similar shapes and may be transformed one into the other by rotation and/or translation. Each pair of adjacent baffle teeth 47 delineate a bay 51 between them and each pair of adjacent baffle teeth 48 delineate a bay 52 between them. Optionally, the baffle teeth are equally spaced one from the other in their respective arrays by a same distance. Details of shark-fin baffle teeth 47 and 48 are most clearly shown in FIGS. 1B and 1D.

Each shark-fin baffle tooth 47 and 48 has a swept back leading-edge face surface 61 and a trailing-edge surface 62. In a given baffle tooth 47 or 48 the trailing-edge surface 62 makes an external angle $\beta$ (FIG. 1D) with the wall 41 or 42 respectively from which it extends and an internal "included" tooth angle $\alpha$ with the leading-edge face surface 61 of the given baffle tooth. Angle $\alpha$ is optionally between 15° and 45° and angle $\beta$ is optionally between 80° to 100° and preferably substantially equal to 90°. In accordance with an embodiment of the invention, as shown in FIGS. 1A-1D, an upstream face of a baffle tooth in one array is parallel to the downstream face of its nearest neighbor in the opposing array. Leading and trailing-edge face surfaces 61 and 62 of a given baffle tooth 47 or 48 intersect a relatively narrow optionally rectangular, planar end surface 64 (FIG. 1B) of the tooth. Optionally, end surfaces 64 of teeth in opposing baffle teeth arrays 45 and 46 are substantially coplanar and lie substantially on or intersect a same plane schematically indicted in FIGS. 1B and 1D by a dashed line 50. (It is noted that if a labyrinth such as labyrinth 40 is produced by injection molding, dies for producing the labyrinth may in some instances require that surfaces of features of the labyrinth, such as face and end surfaces 61, 62 and 64 of baffle teeth 47 and 48 be slightly angled at a release angle. The release angle allows satisfactory release of the labyrinth from the die that produces it after production. In FIG. 1D a die release angle would result in surfaces 61, 62 and 64 being slightly tilted away from the normal to the plane of the figure. End surfaces 64 would then intersect the planar surface indicated by numeral 50 at the release angle and not lie completely on the surface.)

In accordance with an embodiment of the invention, an upstream face of a baffle tooth in one array is different, i.e. has a different configuration, respectively from the upstream face of its nearest neighbors in the opposing array and/or a downstream face of a baffle tooth in one array is different from the downstream face of its nearest neighbors in the opposing array. Optionally, in section 40a of labyrinth 40, leading-edge face surfaces 61 of each baffle tooth 47 in array 45 faces upstream and leading-edge face surfaces 61 of its nearest baffle teeth neighbors 48 in array 46 face downstream. Optionally, in section 40b of labyrinth 40, leading-edge faces 61 of each baffle tooth 47 face downstream while the leading-edge face surfaces of its nearest opposing neighbors face upstream. It is noted that whereas in labyrinth 40, baffle teeth in different sections, i.e. 40a and 40b, of the array are shown facing opposite upstream and downstream directions, a labyrinth in accordance with an embodiment of the invention, similar to labyrinth 40, may have baffle teeth in a same array in different sections of the labyrinth face a same direction.

Dimensions of features of labyrinth channel 40 are labeled in FIG. 1D. The labyrinth channel has a depth "D", schematically indicated by a circle with a cross inside to indicate a direction perpendicular to the plane of the figure and width "W". Baffle teeth 47 extend from their associated wall 41 into the channel a distance "B1" and baffle teeth 48 extends from their associated wall 42 into the channel a distance "B2". As a result, bays 51 and 52 have a depth respectively equal to B1 and B2. Optionally, as indicated in FIG. 1D, end surfaces 64 of baffle teeth 47 and 48 are substantially coplanar so that W=B1+B2. Optionally B1 is equal to B2. A leading-edge face surface 61 of a baffle tooth 47 and a nearest leading-edge face surface 61 of a baffle tooth 48 are separated by a distance "A1". A trailing-edge face surface 62 of a baffle tooth 47 and a nearest trailing-edge face surface 61 of a baffle tooth 48 are separated by a distance "A2". Optionally, A1=A2. Optionally, distance between an end surface 64 of a given baffle tooth 47, 48 and the opposing wall 42, 41 towards which the given tooth extends, is respectively larger than A1 or A2 and preferably at least equal to B2 or B1 respectively. End surfaces 64 have a width "e" and baffle teeth 47 and 48 in a same array 45 and 46 respectively are separated by a distance "L". For the exemplary embodiment of the invention shown in FIGS. 1A-1D, for which an upstream face of a baffle tooth in one array is parallel to the downstream face of its nearest neighbor in the opposing array, L=A1/cos α+A2/sin β+2 e.

By way of a numerical example, optionally, A1 and A2 satisfy a relationship 3 mm≧A1, A2≧0.3 mm and A1=A2=A. Optionally B1=B2=B and A and B satisfy a relationship of 2A≧B≧A. Optionally, 2A≧D≧0.5A and 0≧e≧0.25A.

The inventors have performed theoretical studies of the efficiency of a labyrinth channel in accordance with an embodiment of the invention that is similar to labyrinth channel 40 and has dimensions similar to those noted above. The studies indicate that per unit length, a labyrinth channel in accordance with an embodiment of the invention provides resistance to fluid flow that is greater than that provided by prior art labyrinth channels having similar dimensions. In particular, the studies indicate that the turbulence or "head loss" coefficient "K" for a single baffle tooth in a labyrinth in accordance with an embodiment of the invention may be as much as 16% greater than that of prior baffle teeth in prior art labyrinths having similar dimensions.

As a result of the improved resistance to fluid flow per unit length, a labyrinth configuration in accordance with an embodiment of the invention provides greater design latitude in tailoring a labyrinth to a given desired range in pressure drop between an inlet and an outlet of the labyrinth and/or flow rates through the labyrinth than conventional labyrinth configurations.

For example, for a given desired or anticipated pressure drop, a labyrinth in accordance with an embodiment of the invention can generally be made shorter than a conventional labyrinth. An emitter comprising a shorter labyrinth, is generally less expensive to make and less prone to clogging by particulate matter in fluids discharged by the emitter than an emitter comprising a longer labyrinth. Alternatively, for a given pressure drop, and a same length, a labyrinth in accordance with an embodiment of the invention can be made wider than a conventional labyrinth. A wider labyrinth is usually less prone to trapping particulate matter and clogging than a narrower labyrinth and can be particularly advantageous for use in environments for which fluids discharged by an emitter comprising the labyrinth are expected to be unusually adulterated by particulate matter. Additionally, for a same length, width and operating pressure range drop, a labyrinth in accordance with an embodiment of the invention may advantageously be used to provide a lower fluid flow rate than a conventional labyrinth. For example, for a same pressure operating range of an irrigation emitter, and same length and width of a labyrinth in the emitter, an emitter comprising a labyrinth in accordance with an embodiment of the invention may provide a lower drip rate than a conventional emitter.

It is noted that whereas in the exemplary embodiment of the invention shown in FIGS. 1A-1D, labyrinth channel 40 comprises straight sections, the invention is not limited to straight labyrinths. A labyrinth in accordance with an embodiment of the invention may, for example be curvilinear, elliptical, circular or cylindrical and is not limited to planar labyrinths.

Figure 2A:
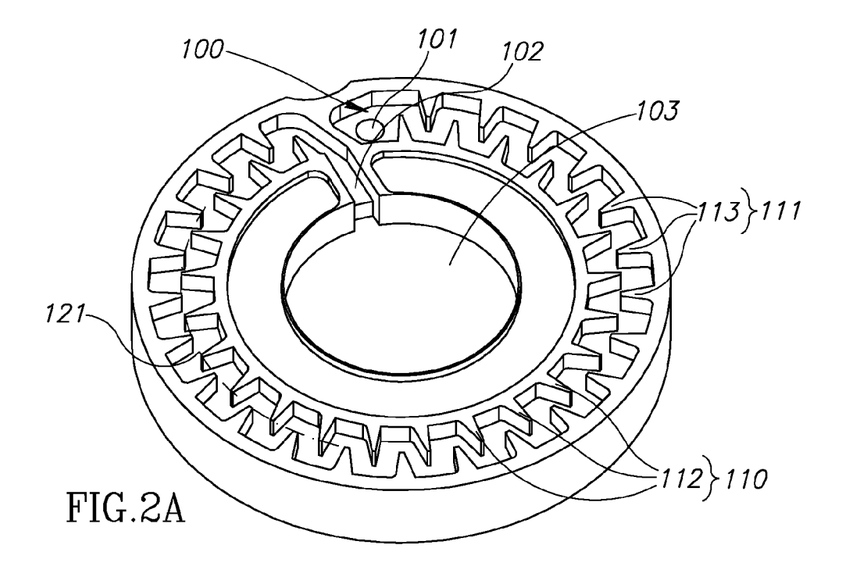
FIGS. 2A and 2B schematically show perspective and plan views of a circular labyrinth in accordance with an embodiment of the invention.
Figure 2B:
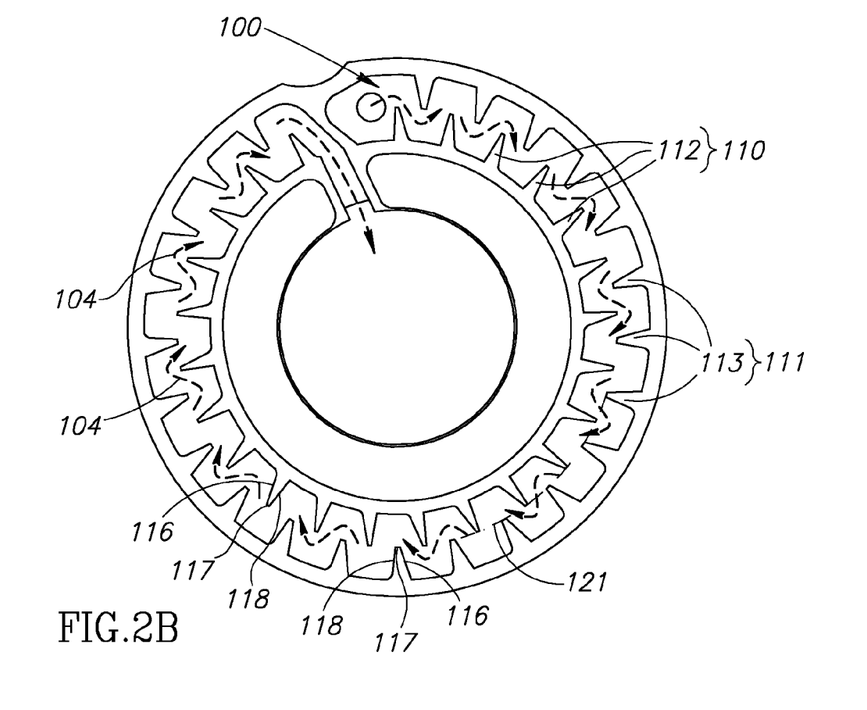

FIGS. 2A and 2B schematically show perspective and plan views of a circular emitter labyrinth channel 100, in accordance with an embodiment of the invention. In the figures only features of the emitter that are germane to labyrinth channel 100 are shown. Water optionally enters labyrinth channel 100 through an inlet portal 101 and empties into a discharge reservoir 102 via an outlet portal 103. Water flow is indicted by dashed arrows 104.

Labyrinth channel 100 comprises an inner array 110 of optionally shark-fin baffle teeth 112 and an opposing outer array 111 of shark-fin baffle teeth 113. Shark-fin baffle teeth 112 and 113 have leading-edge face surfaces 116 (FIG. 2B) and trailing-edge face surfaces 118 and ends 117. Optionally, ends 117 lie substantially on or intersect a same circularly cylindrical surface indicated by a dashed line 121. By way of example, leading-edge surfaces 116 of baffle teeth 113 in array 111 face upstream while leading-edge surfaces 116 of baffle teeth 112 in array 110 face downstream. It is noted that in labyrinth channel 100 all the baffle teeth in a same array, optionally as shown in FIGS. 2A and 2B, face a same direction.

Figure 3A:
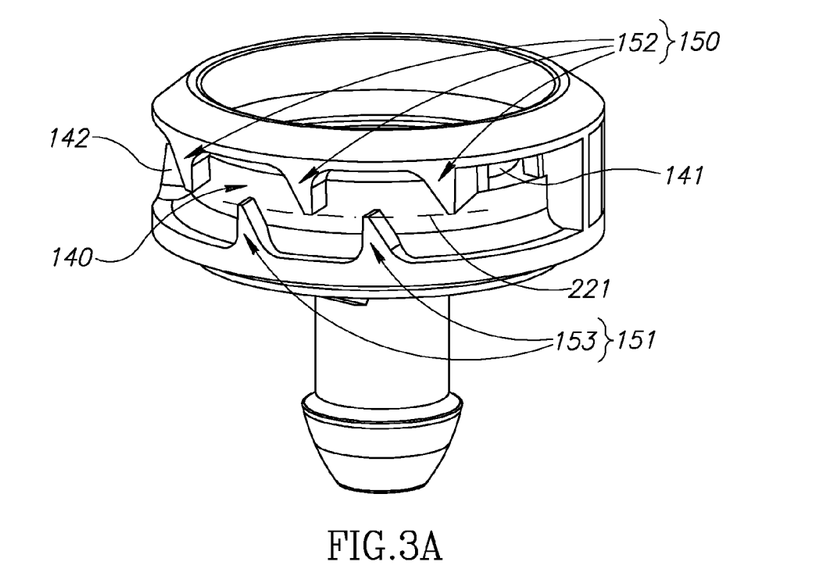
FIGS. 3A and 3B schematically show perspective and side views of a cylindrical labyrinth in accordance with an embodiment of the invention.
Figure 3B:
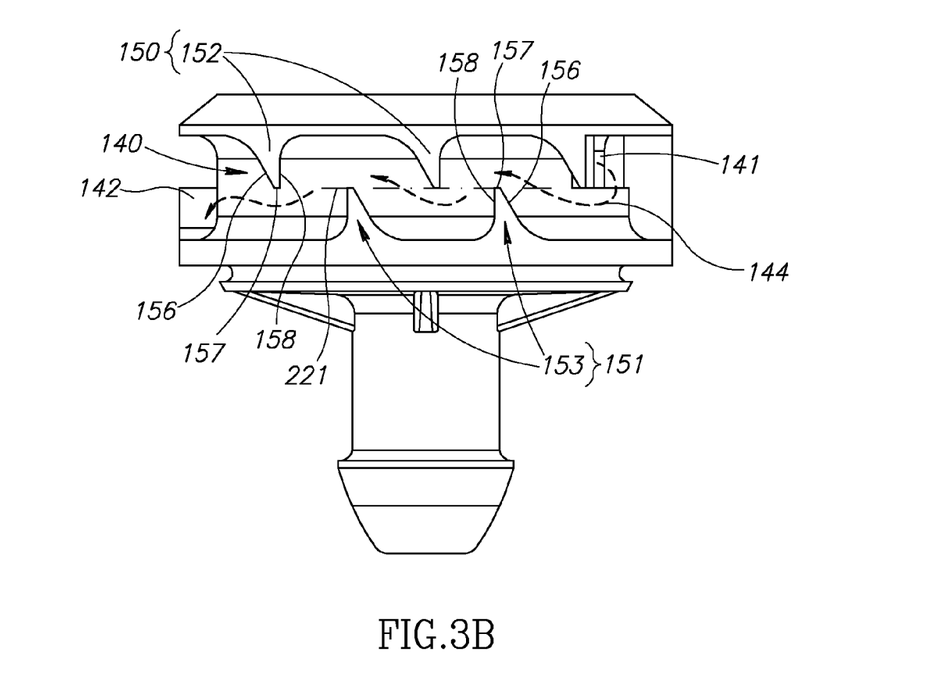

FIGS. 3A and 3B schematically show perspective and plan views of a cylindrical emitter labyrinth channel 140, in accordance with an embodiment of the invention. Only features of the emitter that are germane to labyrinth channel 140 are shown. Water optionally enters labyrinth channel 140 through an inlet portal 141 and empties into a discharge reservoir, not shown, via an outlet portal 142. Water flow is indicted in FIG. 3B by dashed arrows 144.

Labyrinth channel 140 comprises an upper array 150 of optionally shark-fin baffle teeth 152 and an opposing lower array 151 of shark-fin baffle teeth 153. Shark-fin baffle teeth 152 and 153 have leading-edge face surfaces 156, trailing edge face surfaces 158 and ends 157. Optionally ends 157 are substantially coplanar and lie substantially on or intersect a same plane schematically indicted by a dashed line 221. By way of example, leading-edge surfaces 156 of baffle teeth 152 face downstream while leading edge surfaces 156 of baffle teeth 153 face upstream.

It is noted that in the above embodiments of the invention, ends of baffle teeth in different opposing arrays of baffle teeth comprised in a labyrinth are indicated as being contiguous with a same surface, a "contour surface", that follows a contour of the labyrinth. For example, the ends of baffle teeth in opposing arrays of labyrinth 40 and 140 (FIGS. 1B, 1D, 3A, 3B) are indicated as lying in or intersecting a same plane while baffle teeth in opposing arrays of labyrinth 100 lie on or intersect a same circularly cylindrical surface (FIGS. 2A, 2B). In some embodiments of the invention, ends of baffle teeth in different opposing arrays are not contiguous with a same contour surface. In some embodiments of the invention, ends of baffle teeth in a same array of opposing arrays of baffle teeth in a labyrinth are contiguous with a same contour surface while ends of baffle teeth in different arrays are contiguous with different parallel contour surfaces.

Figure 4:
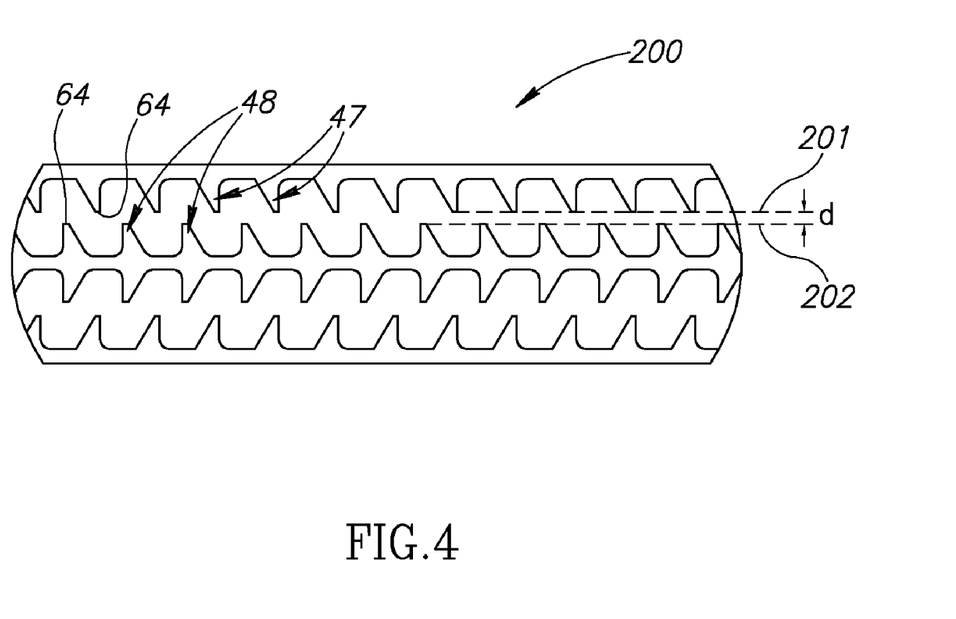
FIG. 4 schematically shows a plan view of a portion of a labyrinth similar to the labyrinth shown in FIG. 1B and FIG. 1D, in accordance with an embodiment of the invention.

By way of example, FIG. 4 schematically shows a plan view of a portion of a labyrinth 200 similar to labyrinth 40 shown in FIG. 1B and FIG. 1D. However, whereas in labyrinth 40, ends 64 of opposing baffle teeth 47 and 48 are substantially contiguous with a same plane 50, in labyrinth 200 ends 64 of baffle teeth 47 are coplanar with a plane 201 while ends 64 of opposing baffle teeth 48 are coplanar with a different plane 202 parallel to plane 201 but displaced from plane 201 by a distance "d".

It is further noted that whereas in the above discussion it is indicted that a labyrinth may be produced by injection molding, a labyrinth in accordance with an embodiment of the invention is not limited to production by injection molding but may of course be produced using any suitable method known in the art. For example a labyrinth in accordance with an embodiment of the invention may be produced by embossing on a suitable plastic material. In addition a "roof" of a labyrinth in accordance with an embodiment of the invention is not necessarily provided by a wall of an irrigation pipe with which it is used but may be provided in part or completely by a component that is not a part of the wall. It is also noted that a labyrinth in accordance with an embodiment of the invention is not limited to being used with emitters that are internally mounted to an irrigation pipe, but may of course be comprised in emitters that are coupled externally to an irrigation pipe or inline between portions of an irrigation pipe. In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The invention has been described with reference to embodiments thereof that are provided by way of example and are not intended to limit the scope of the invention. The described embodiments comprise different features, not all of which are required in all embodiments of the invention. Some embodiments of the invention utilize only some of the features or possible combinations of the features. Variations of embodiments of the described invention and embodiments of the invention comprising different combinations of features than those noted in the described embodiments will occur to persons of the art. The scope of the invention is limited only by the following claims.

The invention claimed is:

1. A labyrinth channel for reducing pressure and/or flow rate in a liquid flowing in the channel, the labyrinth channel having a bottom surface and first and second opposing walls and comprising:
   a first array of spaced apart first baffle teeth that have non-parallel upstream and downstream faces and extend from the first wall towards the second wall to terminate in an end; and
   a second array of spaced apart second baffle teeth that have non-parallel upstream and downstream faces and extend from the second wall towards the first wall to terminate in an end;
   wherein
   baffle teeth in different arrays have a substantially same shape; and
   upstream faces of closest baffle teeth in different arrays have different orientations with respect to the walls from which they extend and/or downstream faces of closest baffle teeth in different arrays have different orientations with respect to the walls from which they extend.

2. A labyrinth channel according to claim 1 wherein ends of the first baffle teeth are contiguous with or intersect a same first surface that follows a contour of the labyrinth flow channel.

3. A labyrinth channel according to claim 2 wherein ends of the second baffle teeth are contiguous with or intersect a same second surface that follows a contour of the labyrinth flow channel.

4. A labyrinth channel according to claim 3 wherein the first and second surfaces that follow the channel contour are coincident.

5. A labyrinth channel according to claim 3 wherein the first and second surfaces that follow the channel contour are parallel and displaced one from the other.

6. A labyrinth channel according to claim 1, wherein each tooth has a planar trailing-edge surface that makes an external angle $\beta$ with the wall from which the tooth extends.

7. A labyrinth channel according to claim 6 wherein $\beta$ has a value less than or equal to 100°.

8. A labyrinth channel according to claim 6 wherein $\beta$ has a value greater than or equal to 80°.

9. A labyrinth channel according to claim 6 wherein $\beta$ has a value substantially equal to 90°.

10. A labyrinth channel according to claim 6 wherein each tooth has a planar leading-edge surface that makes an included angle $\alpha$ with the trailing edge surface.

11. A labyrinth channel according to claim 10 wherein a has $\alpha$ value less than or equal to 45°.

12. A labyrinth channel according to claim 10 wherein a has $\alpha$ value greater than or equal to 15°.

13. A labyrinth channel according to claim 10 wherein the value of $\alpha$ is the same for all baffle teeth.

14. A labyrinth channel according to claim 6 wherein the value of $\beta$ is the same for all baffle teeth.

15. A labyrinth channel according to claim 10 wherein one of the leading-edge and trailing-edge face surfaces of a tooth is an upstream face of the tooth.

16. A labyrinth channel according to claim 15 wherein if the upstream face of a first tooth is a leading-edge surface of the tooth, the downstream face of the nearest second tooth is the leading-edge surface of the second tooth.

17. A labyrinth channel according to claim 1 wherein the upstream and downstream faces of a first baffle tooth are respectively parallel with the downstream and upstream faces of a nearest second baffle tooth.

18. A labyrinth channel according to claim 17 wherein a distance between the upstream face of a first baffle tooth and a nearest downstream face of a second baffle tooth is equal to a same distance A between the downstream face of the first baffle tooth and the nearest upstream face of a second baffle tooth.

19. A labyrinth channel according to claim 18 wherein A is less than or equal to 3 mm.

20. A labyrinth channel according to claim 18 wherein A is greater than or equal to 0.3 mm.

21. A labyrinth channel according to claim 18 wherein the ends of the first and second teeth are located a same distance B from the respective walls from which they extend.

22. A labyrinth channel according to claim 21 wherein the channel has a width greater than 2B.

23. A labyrinth channel according to claim 21 wherein the channel has a width less than 2B.

24. A labyrinth channel according to claim 21 wherein the channel has a width substantially equal to about 2B.

25. A labyrinth channel according to claim 21 wherein B is greater than A.

26. A labyrinth channel according to claim 1 wherein the leading-edge and trailing-edge face surfaces intersect a common surface at different locations of the common surface to define an end surface of the tooth.

27. A labyrinth channel according to claim 26 wherein the common surface is planar.

28. A labyrinth channel according to claim 27 wherein the intersections of the leading and trailing edge surfaces are different parallel straight lines.

29. A labyrinth channel according to claim 1 wherein the labyrinth channel or portion thereof is straight.

30. A labyrinth channel according to claim 1 wherein the labyrinth channel or a portion thereof is circular.

31. A labyrinth channel according to claim 1 wherein the bottom surface of the labyrinth channel or portion thereof is substantially a circularly cylindrical surface.

* * * * *